(12) United States Patent
Tsuchiya et al.

(10) Patent No.: US 7,978,481 B2
(45) Date of Patent: Jul. 12, 2011

(54) HARNESS ROUTING STRUCTURE

(75) Inventors: Takenori Tsuchiya, Toyota (JP); Takahiro Suzuki, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 626 days.

(21) Appl. No.: 12/084,291

(22) PCT Filed: Nov. 16, 2006

(86) PCT No.: PCT/IB2006/003234
§ 371 (c)(1),
(2), (4) Date: Apr. 29, 2008

(87) PCT Pub. No.: WO2007/057753
PCT Pub. Date: May 24, 2007

(65) Prior Publication Data
US 2009/0129044 A1    May 21, 2009

(30) Foreign Application Priority Data
Nov. 21, 2005    (JP) .................................. 2005-336030

(51) Int. Cl.
*H02B 1/20*    (2006.01)
(52) U.S. Cl. .......................... 361/826; 361/825; 361/728
(58) Field of Classification Search .................. 361/825, 361/826, 807, 810, 600, 728; 320/113; 429/96, 429/100; 174/72 A
See application file for complete search history.

(56) References Cited

U.S. PATENT DOCUMENTS

| | | | | |
|---|---|---|---|---|
| 5,248,927 A * | 9/1993 | Takei et al. | .................. | 320/113 |
| 5,530,625 A * | 6/1996 | VanDerStuyf et al. | ........ | 361/794 |
| 5,736,271 A * | 4/1998 | Cisar et al. | ...................... | 429/96 |
| 5,739,666 A * | 4/1998 | Nierescher et al. | ........... | 320/113 |
| 2002/0043958 A1* | 4/2002 | Yamaguchi et al. | .......... | 320/113 |
| 2003/0048091 A1 | 3/2003 | Sato et al. | | |
| 2004/0228074 A1* | 11/2004 | Tu et al. | ........................ | 361/679 |
| 2007/0141451 A1* | 6/2007 | Marukawa et al. | ........... | 429/100 |
| 2007/0269713 A1* | 11/2007 | Hanson et al. | .................. | 429/99 |
| 2010/0090646 A1* | 4/2010 | Mori et al. | ..................... | 320/113 |
| 2010/0109605 A1* | 5/2010 | Nakasho et al. | .............. | 320/113 |
| 2010/0114762 A1* | 5/2010 | Ishii | ............................... | 705/40 |

FOREIGN PATENT DOCUMENTS

| | | |
|---|---|---|
| JP | 07 186732 A | 7/1995 |
| JP | 2000-343341 A | 12/2000 |
| JP | 2000-344026 A | 12/2000 |
| JP | 2002-219949 A | 8/2002 |

(Continued)

OTHER PUBLICATIONS

Office Action drafted Mar. 18, 2011 in JP 2005—-336030 & English translation thereof.

*Primary Examiner* — Jayprakash N Gandhi
*Assistant Examiner* — Xanthia Cunningham
(74) *Attorney, Agent, or Firm* — Kenyon & Kenyon LLP

(57) ABSTRACT

A harness routing structure comprises: a battery case that defines an internal space which houses a battery and an electric appliance on a hybrid motor vehicle, and that is formed of a first member; a reinforcement that is provided in the battery case, and that is formed of a second member having a greater strength than the first member and that reinforces the battery case; and a harness routed at a position along the reinforcement.

8 Claims, 7 Drawing Sheets

FOREIGN PATENT DOCUMENTS

| | | |
|---|---|---|
| JP | 2003-346759 A | 12/2003 |
| JP | 2005-153827 A | 6/2005 |
| JP | 2005-238941 A | 9/2005 |
| JP | 2005-271878 A | 10/2005 |
| WO | WO 94/14628 A1 | 7/1994 |
| WO | 2005/051697 A1 | 6/2005 |

* cited by examiner

HARNESS ROUTING STRUCTURE

This is a 371 national phase application of PCT/IB2006/003234 filed 16 Nov. 2006, claiming priority to Japanese Patent Application No. 2005-336030 filed 21 Nov. 2005, the contents of which are incorporated herein by reference.

FIELD OF THE INVENTION

The invention relates to a routing structure of a harness. More concretely, the invention relates to a routing structure of a harness that extends from a battery mounted in a vehicle.

BACKGROUND OF THE INVENTION

In relation to a harness routing structure, for example, Japanese Patent Application Publication No. JP-A-2003-346759 discloses a battery system for the purpose of improving safety. The battery system disclosed in this document has a buffer portion, and is equipped with a battery cover that covers a module assembly. The buffer portion is formed through the foaming molding of plastic. An electrically conductive member, such as a main battery cable or the like, that is connected to a module assembly is disposed so as to face the buffer portion.

Besides, Japanese Patent Application Publication No. JP-A-2005-153827 discloses a vehicular electricity storage device for the purpose of reducing the number of component parts and the number of man-hours for production and uni-forming the height of a base plate. Besides, Japanese Patent Application Publication No. JP-A-2002-219949 discloses a vehicular electric power source device for the purpose reducing the number of component parts and lowering the production cost.

In the aforementioned battery system disclosed in Japanese Patent Application Publication No. JP-A-2003-346759, the buffer portion absorbs force exerted from the outside and thereby prevents the force from being directly transferred to an electrically conductive member such as the main battery cable or the like. However, in this case, since it is necessary to provide the buffer portion at a position where exertion of force from the outside is expected, the number of component parts of the battery system may increase, or the construction may become complicated.

DISCLOSURE OF THE INVENTION

Accordingly, it is an object of the invention to provide a harness routing structure that prevents excessive force on the harness while having a simple construction.

A harness routing structure in a first aspect of the invention comprises: a case body that defines an internal space which houses a high-voltage electric component part in a vehicle, and that is formed of a first member; a reinforcing member that is provided on the case body, and that is formed of a second member having a greater strength than the first member, and that reinforces the case body; and a harness routed at a position along the reinforcing member.

According to the harness routing structure constructed as described above, in the situation where the vehicle is struck from behind or the like, the impact on the harness can be reduced by the reinforcing member that is provided for reinforcing the case body. Therefore, excessive force on the harness can be prevented by a simple construction.

The reinforcing member may be disposed at a side of the harness opposite from the high-voltage electric component part housed in the internal space, in a sectional view taken on a plane orthogonal to an extending direction of the harness. According to the harness routing structure constructed as described above, the impact exerted on the harness from the side of the harness opposite from the high-voltage electric component part can be reduced by the reinforcing member.

The reinforcing member may be angularly bent so that a recess portion is formed at a side of the harness opposite from the high-voltage electric component part housed in the internal space, and faces the harness, in a sectional view taken on a plane orthogonal to an extending direction of the harness. Also, the reinforcing member may be curved so that a recess portion is formed at a side of the harness opposite from the high-voltage electric component part housed in the internal space, and faces the harness, in a sectional view taken on a plane orthogonal to an extending direction of the harness. According to the harness routing structure constructed as described above, the reinforcing member is provided so as to cover the harness at a side thereof opposite from the high-voltage electric component part. Therefore, the impact on the harness can be reliably reduced by the reinforcing member.

The harness may be routed in the internal space. According to the harness routing structure constructed as described above, the harness is routed at a position that is surrounded by the case body. Therefore, in addition to the reinforcing member, the case body also reduces the impact that is exerted on the harness.

Besides, the harness may be routed outside the internal space. The reinforcing member may be formed of a metal (e.g., a steel). According to the harness routing structure constructed as described above, the reinforcing member can prevent leakage of electromagnetic waves emitted from the harness.

Besides, the high-voltage electric component part may be a battery unit that includes at least a battery. According to the harness routing structure constructed as described above, the harness routed around the battery unit can be protected.

Besides, the battery unit may further include an appliance that is juxtaposed with the battery in a vehicular transverse direction. The reinforcing member may be provided on a vehicular rearward side of the case body so as to be astride the battery and the appliance. According to the harness routing structure constructed as described above, the possibility of the harness breaking in the situation where the vehicle receives impact from behind can be reduced, in comparison with a configuration in which the harness is routed on a vehicular forward side.

Besides, the harness may be connected to the high-voltage electric component part. According to the harness routing structure constructed as described above, the harness connected to the high-voltage electric component part can be protected.

As described above, according to the aspects and forms of carrying out the invention, a harness routing structure that prevents exertion of excessive force on the harness while adopting a simple construction can be provided.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
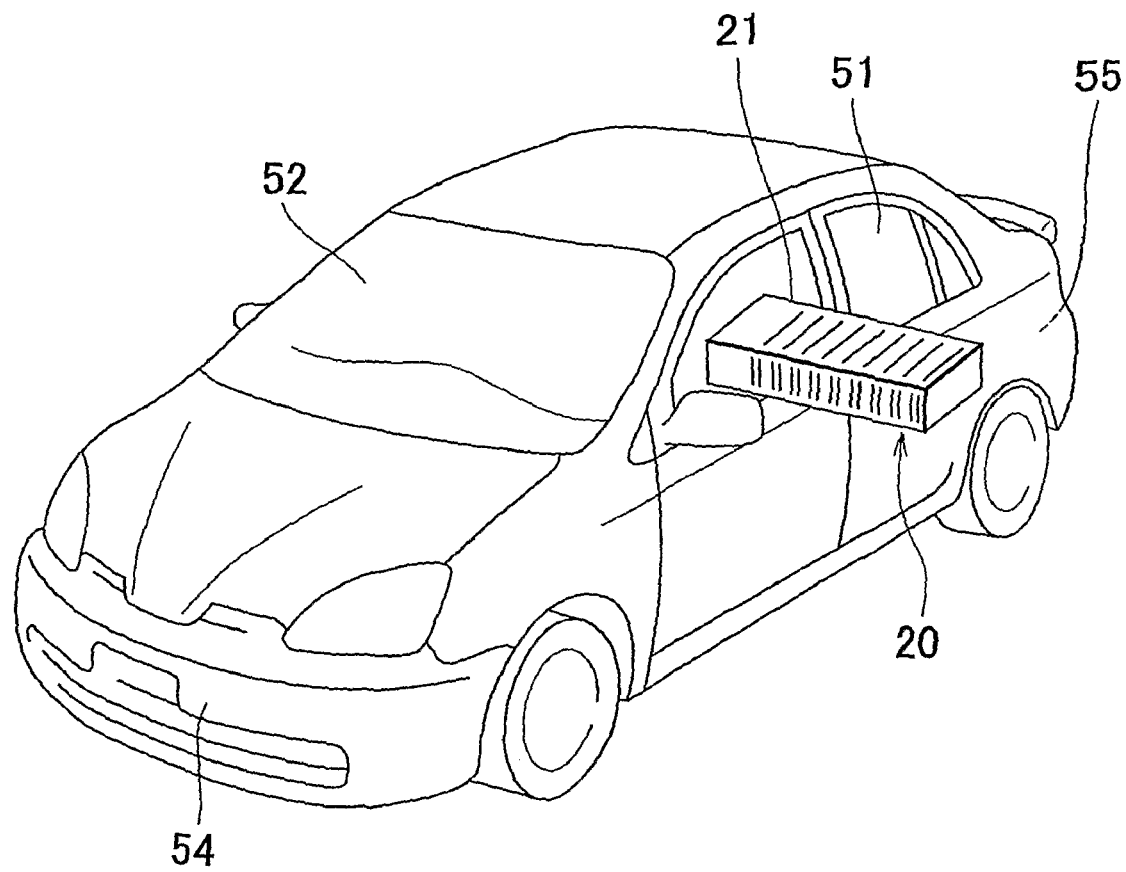
FIG. 1 is a perspective view showing a vehicle to which a harness routing structure in a first embodiment is applied.

Embodiments of this invention will be described with reference to the drawings. In the drawings that are referred to below, the same or comparable members are denoted by the same reference characters.

FIG. 1 is a perspective view showing a vehicle to which a harness routing structure in accordance with a first embodiment is applied. The drawing shows a hybrid motor vehicle that has an internal combustion engine, such as a gasoline engine, a diesel engine, etc., and a chargeable and dischargeable secondary cell (battery), as motive power sources.

As shown in FIG. 1, the hybrid motor vehicle is provided with a vehicle cabin 52 for accommodating vehicle occupants, and a luggage compartment 51 for storing luggage. The vehicle cabin 52 and the luggage compartment 51 are separated by a partition panel (not shown). The hybrid motor vehicle has a front bumper 54 that is disposed at a forefront end of the vehicle, and a rear bumper 55 that is disposed at a rearmost end of the vehicle. The front bumper 54 and the rear bumper 55 are provided as body portions that are disposed along outer peripheries of the vehicle when seen from above.

A battery pack 20 is disposed in the luggage compartment 51. The battery pack 20 is provided at a position that is further from the front bumper 54 than from the rear bumper 55.

The battery pack 20 has a battery case 21 for housing a battery (not shown). The battery case 21 has a generally rectangular parallelepiped shape that has a longer side and a shorter side. The battery case 21 is placed so that the shorter side thereof substantially coincides with the longitudinal direction of the vehicle and the longer side thereof substantially coincides with the transverse direction of the vehicle.

The battery case 21 is formed of a metal. For example, it is formed of a zinc-plated steel sheet. The battery case 21 in this embodiment is formed of a steel sheet that has a thickness of 0.7 mm.

Figure 2:
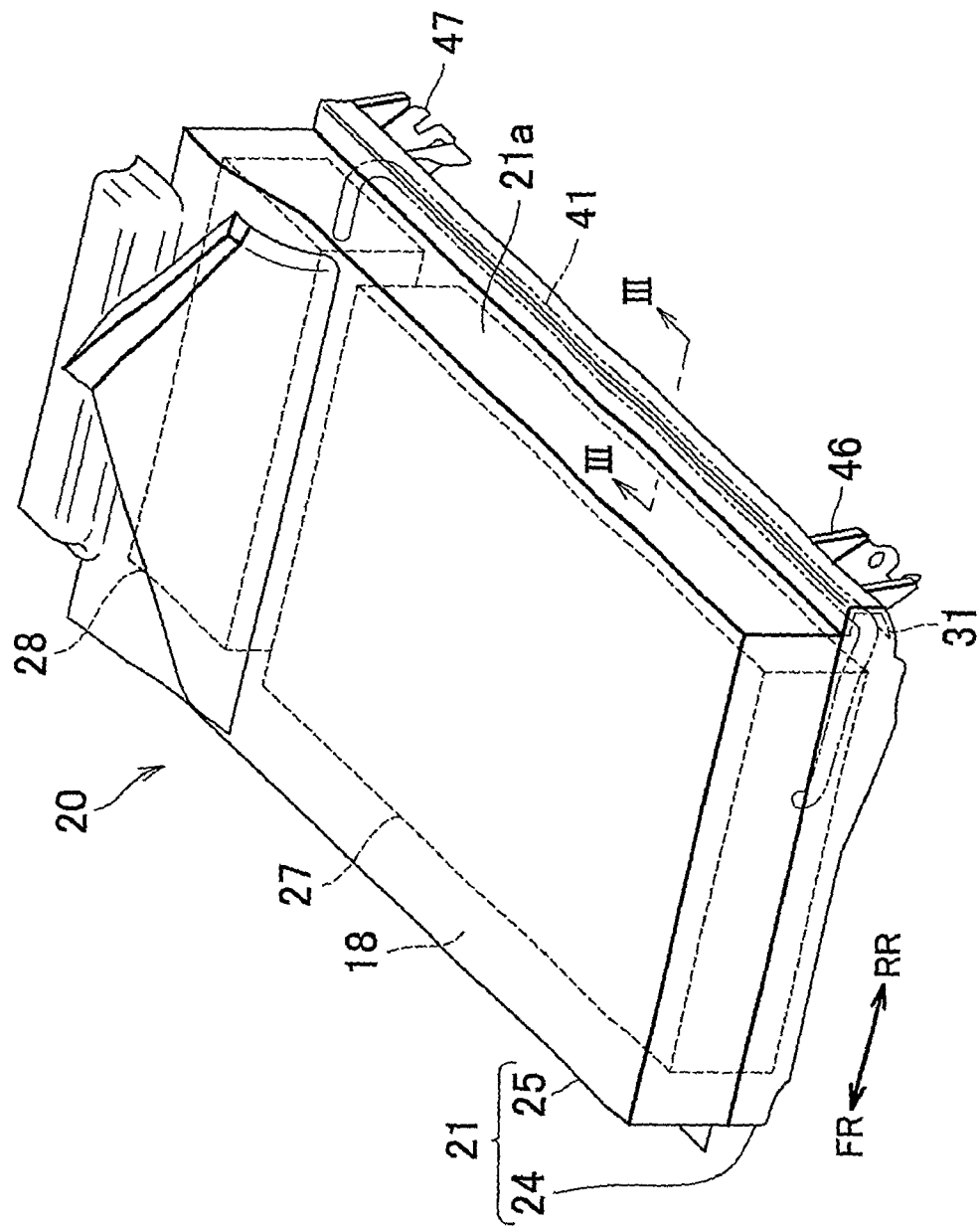
FIG. 2 is a perspective view showing a battery pack shown in FIG. 1.

FIG. 2 is a perspective view showing the battery pack 20 shown in FIG. 1. The battery case 21 has an internal space 18. A battery 27 is housed in the internal space 18. The battery 27 supplies electric power to an electric motor when the vehicle is starting off, accelerating, climbing a hill, or the like, and stores electric power provided by the regenerative power generation during deceleration of the vehicle. The battery 27 is not particularly limited as long as it is a chargeable and dischargeable secondary battery. For example, it may be nickel metal hydride battery, or a lithium ion battery.

An electric appliance 28 that is electrically connected to the battery 27 is also housed in the internal space 18. The battery 27 and the electric appliance 28 are juxtaposed substantially horizontally. Furthermore, the battery 27 and the electric appliance 28 are juxtaposed in the transverse direction of the vehicle. The battery 27 has a greater weight than the electric appliance 28.

The electric appliance 28 comprises a plurality of appliances, including a DC-DC converter, a battery computer, a relay that controls a high-voltage circuit of the battery 27, various sensors that detect states of the battery 27, a service plug for disconnecting the high-voltage circuit at the time of check/maintenance of the battery pack 20, etc. The DC-DC converter drops the high voltage output from the battery 27 to a voltage for use for accessories of the vehicle, such as lamps, audio components, etc., and various ECUs (electronic control units) mounted in the vehicle, and thus charges an auxiliary battery (not shown).

The battery case 21 has a lower case 24 and an upper case 25. The lower case 24 is a component part that receives the weight of the battery 27 and the electric appliance 28. The upper case 25 is a component part disposed on an upper side of the lower case 24 and attached to the lower case 24 so as to cover the battery 27 and the electric appliance 28. That is, the battery case 21 has the lower case 24 and the upper case 25 as first and second case body portions that are combined to cover the battery 27 and the electric appliance 28.

The battery case 21 has a side face 21a that faces the rear of the vehicle. The battery case 21 is provided with plates 46 and 47 as case body-fixing members that are fixed to the vehicle main body. The plates 46 and 47 are provided on a vehicular rearward side of the battery case 21 that is rearward in the vehicle. The plates 46, 47 are provided at opposite ends of the battery case 21 that are apart from each other in the vehicular transverse direction.

In this embodiment, the plates 46, 47 are fixed to a cross member that is a vehicle body frame provided in the luggage compartment 51. The member or the like to which the plates 46, 47 are fixed is not particularly limited as long as it is a structural part having rigidity, on the vehicle main body side. For example, the plates 46, 47 may be fixed to side members, or may also be directly fixed to a floor surface of the luggage compartment 51. Furthermore, a vehicular forward side of the battery case 21 that is forward in the vehicle is also fixed to the vehicle main body, at a plurality of fixture positions that are spaced from each other in the vehicular transverse direction.

Figure 3:
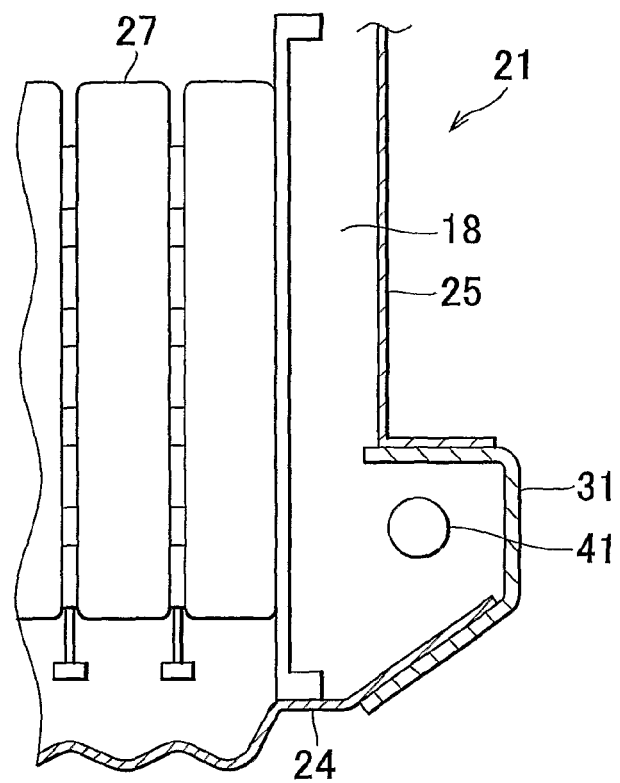
FIG. 3 is a sectional view of the battery pack taken on line III-III in FIG. 2.

FIG. 3 is a sectional view of the battery pack 20 taken along line III-III in FIG. 2. As shown in FIG. 2 and FIG. 3, the battery case 21 is provided with a reinforcement 31. The reinforcement 31 is provided on the side face 21a of the battery case 21. The reinforcement 31 is interposed between the upper case 25 and the lower case 24. Specifically, the reinforcement 31 is welded to the lower case 24, and the upper case 25 is fastened to the reinforcement 31 by bolts. The reinforcement 31, together with the battery case 21, forms the internal space 18. The reinforcement 31 is provided on a portion of the battery case 21 which faces the rear bumper 55 in FIG. 1, that is, the vehicular rearward side of the battery case 21.

The reinforcement 31 extends in the vehicular transverse direction. The reinforcement 31 extends from an end of the battery 21 to another end thereof in the vehicular transverse direction. The reinforcement 31 extends continuously between the plate 46 and the plate 47. The reinforcement 31 extends astride the battery 27 and the electric appliance 28 that are housed in the internal space 18. The reinforcement 31 extends in a predetermined direction, around the internal space 18.

The reinforcement 31 reinforces the battery case 21. The reinforcement 31 functions as a rib that reinforces the battery case 21 between a plurality of positions at which the battery case 21 is supported, that is, between the plate 46 and the plate 47 in this embodiment. The reinforcement 31 is formed of a member that has a greater strength than a member that forms the battery case 21. In this embodiment, the reinforcement 31 is formed of a steel sheet that has a thickness of 2 mm. Incidentally, the difference in strength between the member forming the battery case 21 and the member forming reinforcement 31 is not limited to the difference based on the different sheet thicknesses of the steel sheets. For example, the strength difference therebetween may be based on the material of the steel sheets, or may be based on both the material and the sheet thickness of the steel sheets. If the strength difference between the battery case 21 and the reinforcement 31 is based on the material, it is permissible, for example, that only the reinforcement 31 is formed of a high-tensile steel.

In the internal space 18, a harness 41 extending between the battery 27 and the electric appliance 28 is routed. The harness 41 is a voltage detection purpose cable for detecting the voltage of the battery 27. The harness 41 is connected to the battery computer that constitutes the electric appliance 28.

The harness 41 is not limited to a voltage detection purpose cable, but may also be, for example, an output cable of the battery 27. In that construction, current having a voltage of, for example, 200V or higher, flows through the harness 41. Besides, the harness 41 is not limited to the wiring that extends between the battery 27 and the electric appliance 28. For example, the harness 41 may be a wiring that is connected to one of the battery 27 and the electric appliance 28. Or, the harness 41 may be a wiring that is not connected to either the battery 27 or the electric appliance 28.

The harness 41 extends out of a side of the battery 27 opposite from the side thereof adjacent to the electric appliance 28, and reaches the electric appliance 28 through a vehicular rearward side portion of the internal space 18. A section of the harness 41 extending in the vehicular rearward side portion of the internal space 18 is routed at a position along the reinforcement 31. The section of the harness 41 extending throughout the vehicular rearward side portion of the internal space 18 is routed on the position along the reinforcement 31. The harness 41 extends substantially in parallel with the extending direction of the reinforcement 31. The harness 41 may be routed so as to contact the reinforcement 31.

The reinforcement 31 has a sectional shape that is angularly bent so that a recess portion is formed at a side of the harness 41 which is opposite from the battery 27 housed in the internal space 18, and faces the harness 41, in a sectional view taken on a plane orthogonal to the extending direction of the harness 41. The reinforcement 31 has a sectional shape that is angularly bent so as to be recessed in the direction toward the inside of the internal space 18 where the battery 27 is disposed, and so as to be protruded toward the outside of the internal space 18. The reinforcement 31 has a sectional shape that covers the harness 41 from three sides and that has an opening at the side where the battery 27 is disposed. The reinforcement 31 may have a sectional shape that surrounds the entire periphery of the harness 41.

The reinforcement 31 is disposed at a side of the harness 41 which is opposite from the battery 27 and the electric appliance 28 that are housed in the internal space 18, in a sectional view taken on a plane orthogonal to the extending direction of the harness 41. The reinforcement 31 is positioned between the harness 41 and the rear bumper 55 shown in FIG. 1. The reinforcement 31 is provided so that, in a plane orthogonal to the extending direction of the harness 41, the distance between the reinforcement 31 and the rear bumper 55 as a body member that is disposed on an outer periphery of the vehicle when seen from above and is the nearest to the battery case 21 is smaller than the distance between the harness 41 and the rear bumper 55.

Figure 4:
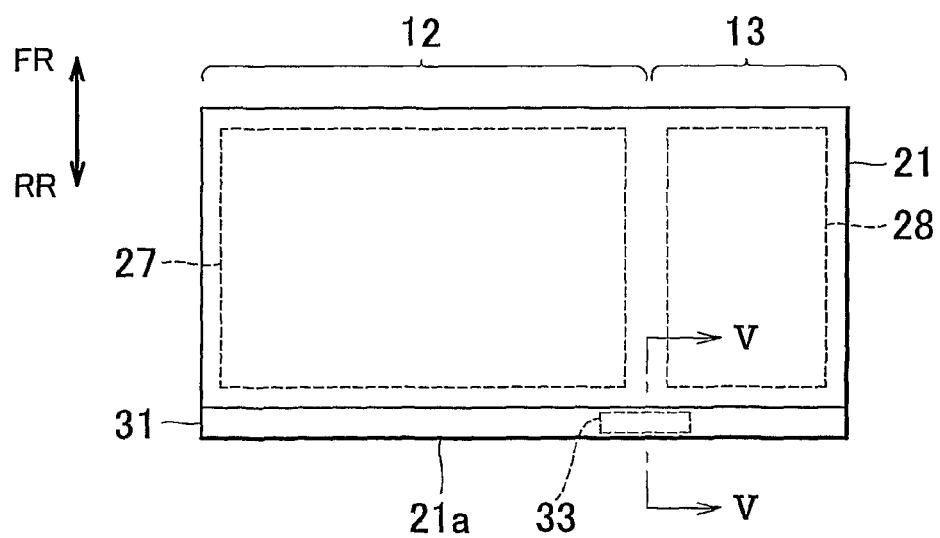
FIG. 4 is a plan view showing the battery pack shown in FIG. 1.
Figure 5:
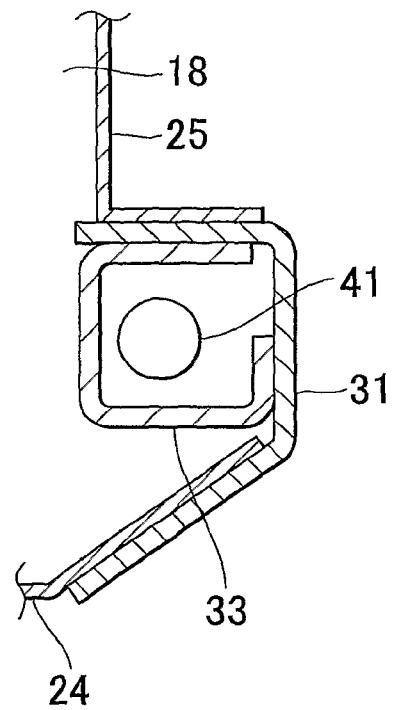
FIG. 5 is a sectional view of the battery pack taken on line V-V in FIG. 4.

FIG. 4 is a plan view showing the battery pack 20 shown in FIG. 1. FIG. 5 is a sectional view of the battery pack 20 taken on line V-V in FIG. 4. As shown in FIGS. 4 and 5, the reinforcement 31 is provided with an auxiliary rib 33. The auxiliary rib 33, together with the reinforcement 31, reinforces the battery case 21.

The auxiliary rib 33 is provided at a boundary position between the battery 27 and the electric appliance 28. The auxiliary rib 33 extends in the vehicular transverse direction. The reinforcement 31 and the auxiliary rib 33 have a sectional shape that surrounds the entire periphery of the harness 41 in a sectional view taken on a plane orthogonal to the extending direction of the harness 41. The reinforcement 31 and the auxiliary rib 33 have a closed annular sectional shape. The auxiliary rib 33 is fixed to the reinforcement 31, for example, by welding.

The battery case 21 has a portion 12 in which the battery 27 is mounted, and a portion 13 adjacent to the portion 12 in which the electric appliance 28 is mounted. In this embodiment, the battery 27 has a greater weight than the electric appliance 28. Therefore, the strength of the portion 13 of the battery case 21 is smaller than the strength of the portion 12 of the battery case 21. Therefore, since the strength of the battery case 21 greatly changes at the boundary position between the portion 12 and the portion 13, the battery case 21 is likely to break at the boundary position if external force is exerted on the battery case 21.

In this embodiment, however, since the auxiliary rib 33 is provided at the boundary position between the portion 12 and the portion 13, the rigidity of the battery case 21 can be effectively improved.

Figure 6:
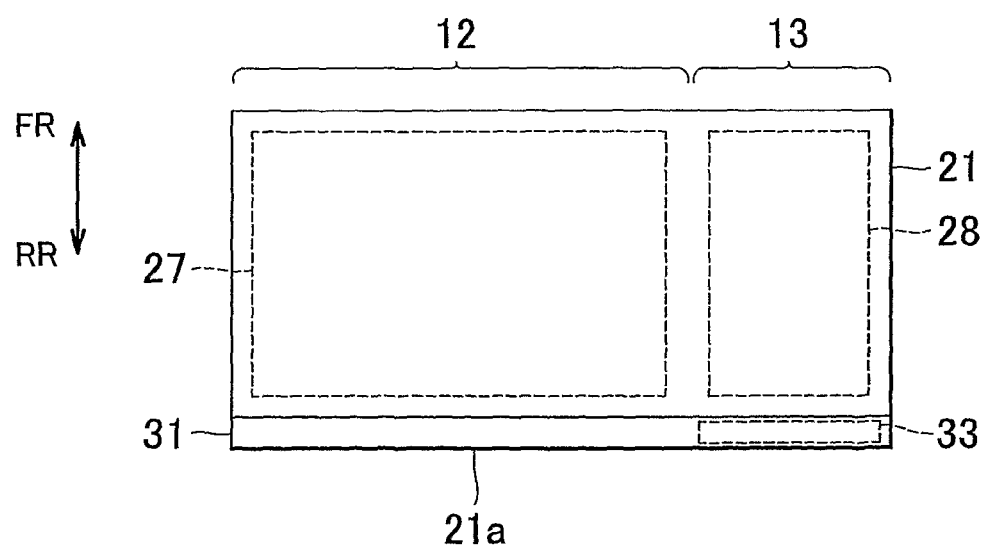
FIG. 6 is a plan view of the battery pack showing a modification of the position where an auxiliary rib shown in FIG. 4 is provided.

FIG. 6 is a plan view the battery pack 20 showing a modification of the position where the auxiliary rib 33 as shown in FIG. 4 is provided. As shown in FIG. 6, in this modification, the auxiliary rib 33 is provided at a position adjacent to the portion 13 of the battery case 21. According to this constitution, the portion 13 of the battery case 21 that is inferior in strength is reinforced, so that the rigidity of the battery case 21 can be effectively improved.

Figure 7:
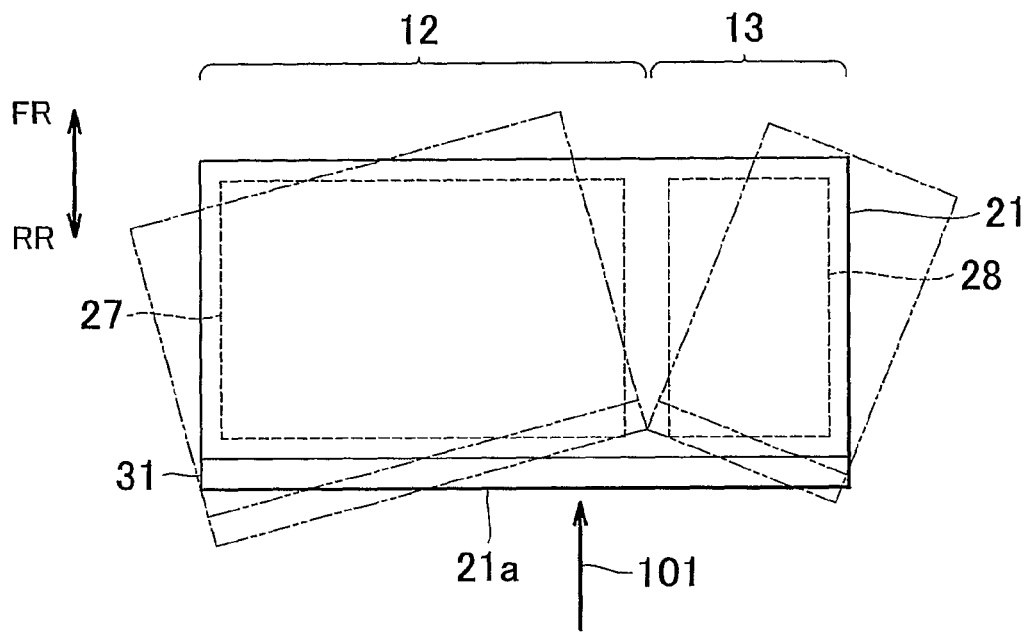
FIG. 7 is a plan view of the battery pack representing a broken state of the battery case.

FIG. 7 is a plan view of the battery pack 20 representing a broken state of the battery case. As shown in FIG. 7, a situation is assumed in which a hybrid motor vehicle is struck from behind, and a thereby caused impact is exerted on the battery case 21 as shown by an arrow 101.

In this situation, there is a possibility of the battery case 21 breaking so that the portion 12 and the portion 13 separate greatly apart from each other at a vehicular forward side, with a fulcrum of the breakage being at a boundary position between the portion 12 and the portion 13 at which the strength of the battery case 21 greatly changes and which is a vehicular rearward side that receives the impact. However, in this embodiment, since the harness 41 is routed at a position along the reinforcement 31 that is provided on the vehicular rearward side of the battery case 21, the risk of breakage of the harness 41 can be reduced in comparison with the situation where the harness 41 is routed on the vehicular forward side.

Figure 8:
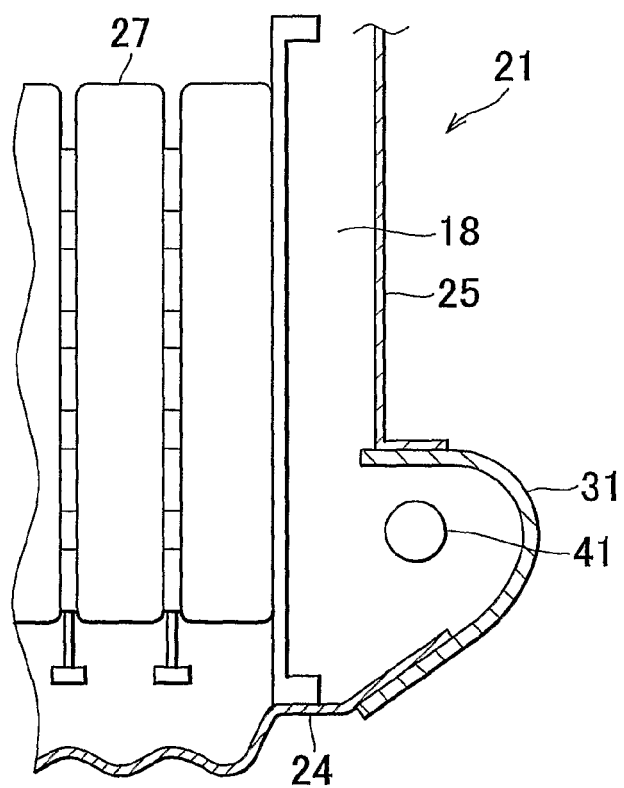
FIG. 8 is a sectional view showing a modification of the battery pack shown in FIG. 3.

FIG. 8 is a sectional view showing a modification of the battery pack 20 shown in FIG. 3. As shown in FIG. 8, in this modification, the reinforcement 31 has a sectional shape that is curved so that a recess portion is formed at a side of the harness 41 which is opposite from the battery 27 housed in the internal space 18, and faces the harness 41, in a sectional view taken on a plane orthogonal to the extending direction of the harness 41. The reinforcement 31 has a sectional shape that is curved so as to be recessed in the direction toward the inside of the internal space 18 where the battery 27 is disposed, and so as to be protruded toward the outside of the internal space 18. That is, the reinforcement 31 may have an angularly bent sectional shape as shown in FIG. 3, or may also have a curved sectional shape as shown in FIG. 8.

The harness routing structure in the first embodiment of the invention has the battery case 21, the reinforcement 31 and the harness 41. The battery case 21 is a case body that defines the internal space 18 that houses the battery 27 and the electric appliance 28 as high-voltage electric component parts in a hybrid motor vehicle as a vehicle. The reinforcement 31 is a reinforcing member which is provided on the battery case 21, and which is formed of a member that has a greater strength than the battery case 21, and which reinforces the battery case 21. The harness 41 is routed at a position along the reinforcement 31.

According to the harness routing structure in the first embodiment constructed as described above, the reinforcement 31 reinforcing the battery case 21 reduces, to a low level, the impact that is exerted on the harness 41 in the situation where the hybrid motor vehicle is struck from behind, or the like. Hence, it is possible to protect the harness 41 while retaining a simple structure of the battery pack 20.

Incidentally, the high-voltage electric component parts housed in the case body may also be an inverter, a converter, a fuel cell, etc. Besides, the high-voltage electric component parts are not limited to a battery cell that creates electricity through chemical changes or the like. For example, the high-voltage electric component parts may include an electricity storage device, such as a capacitor or the like, that stores electricity supplied from the outside.

The capacitor is an electric double-layer capacitor whose operation principle is an electric double layer that occurs in an interface between active carbon and an electrolytic solution. If the active carbon employed as a solid and the electrolytic solution (dilute sulfuric acid aqueous solution) as a liquid are placed in contact with each other, plus and minus electrodes are distributed with very short distance therebetween in the interface therebetween. If a pair of electrodes are dipped in an ionic solution and voltage is applied therebetween to such an extent that electrolysis does not occur, ions are adsorbed to the surfaces of the electrodes, so that plus and minus electricities are stored (charge). If electricity is released to the outside, the positive and negative ions are detached from the electrodes, so that a neutral state is resumed (discharge).

Furthermore, although the embodiment is applied to a hybrid motor vehicle that has an internal combustion engine and a secondary battery as motive power sources, the invention is not limited thereto. For example, the invention is applicable to a fuel cell hybrid vehicle (FCHV: Fuel Cell Hybrid Vehicle) that has a fuel cell and a secondary battery cell as motive power sources, or an electric motor vehicle (EV: Electric Vehicle). In the hybrid motor vehicle of this embodiment, the internal combustion engine is driven at a fuel economy optimal operation point, whereas in the fuel cell hybrid motor vehicle, the fuel cell is driven at an electric power generation optimal operation point. Besides, with regard to the use of the secondary battery, there is no fundamental difference between the two types of hybrid motor vehicle.

Figure 9A:
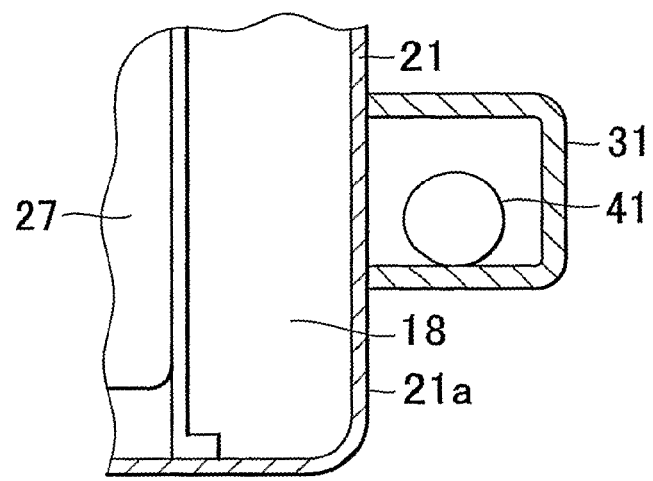
FIGS. 9A to 9C are each a sectional view of the battery pack showing a harness routing structure in the second embodiment.
Figure 9B:
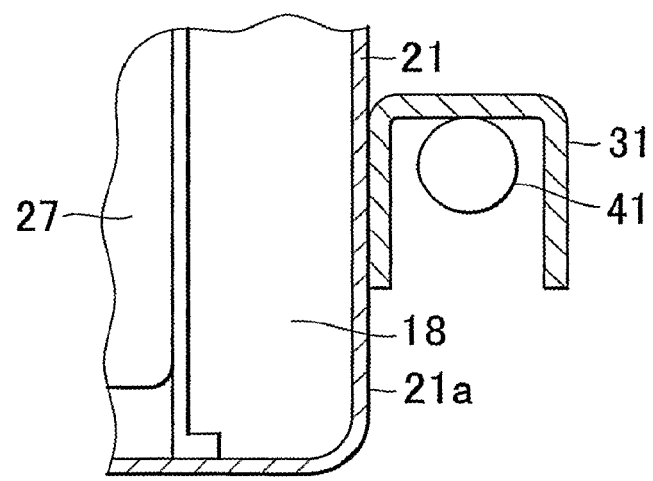
Figure 9C:
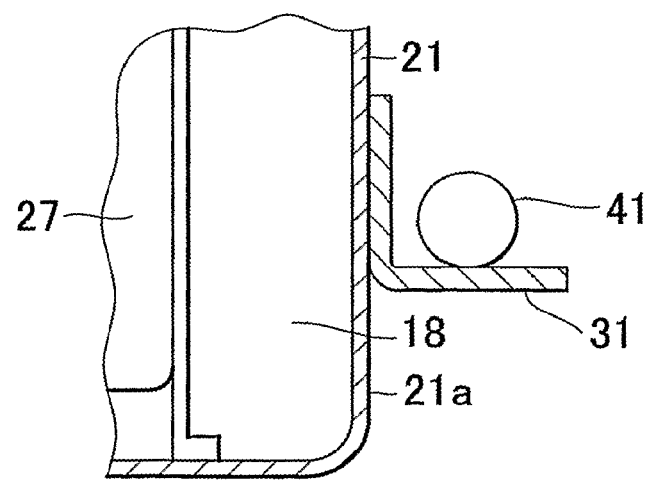

FIGS. 9A to 9C are sectional views of the battery pack 20 showing a harness routing structure in a second embodiment of the invention. FIGS. 9A to 9C correspond to FIG. 3 in the first embodiment. Compared with the harness routing structure in the first embodiment, the harness routing structure in the second embodiment has basically the same structure. Hereinafter, the same structure portions will not be described again.

As shown in FIGS. 9A to 9C, a reinforcement 31 is provided outside an internal space 18 in this embodiment. The harness 41 is routed at a position along the reinforcement 31. In the first embodiment, the harness 41 is routed in the internal space 18. In contrast, in this embodiment, the harness 41 is routed outside the internal space 18.

As shown in FIGS. 9A and 9B, the FIG. 9A has a sectional shape that surrounds the harness 41 from three sides in a sectional view taken on a plane orthogonal to the extending direction of the harness 41. Particularly in FIG. 9A, the entire periphery of the harness 41 is surrounded by the reinforcement 31 and a side face 21a of a battery case 21. In FIG. 9C, a reinforcement 31 having an L-sectional shape is provided on the battery case 21.

In any of the examples shown in FIGS. 9A to 9C, too, the reinforcement 31 is disposed at a side of the harness 41 which is opposite from the battery 27 and an electric appliance 28 housed in the internal space 18, in a sectional view taken on a plane orthogonal to the extending direction of the harness 41. The reinforcement 31 is provided so that, in a plane orthogonal to the extending direction of the harness 41, the distance between the reinforcement 31 and the rear bumper 55 shown in FIG. 1 is smaller than the distance between the harness 41 and the rear bumper 55.

Figure 10:
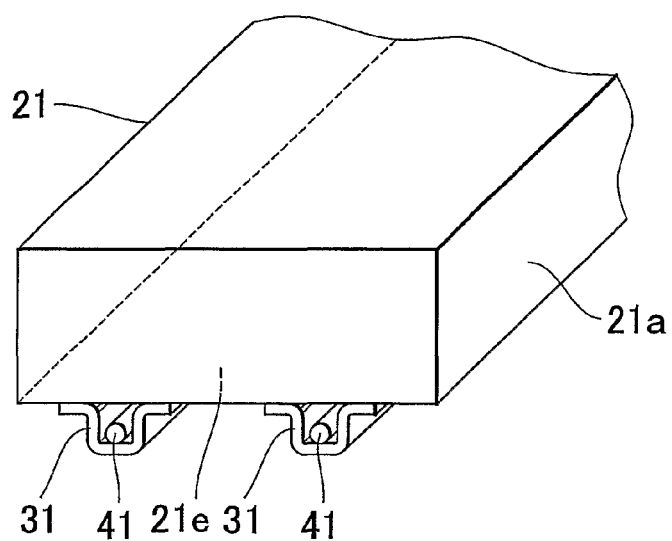
FIG. 10 is a perspective view of the battery pack showing a first modification of the harness routing structure in the second embodiment.

FIG. 10 is a perspective view of the battery pack 20 showing a first modification of the harness routing structure in the second embodiment. As shown in FIG. 10, the battery case 21 further has a bottom face 21e that faces vertically downward. In this modification, the reinforcement 31 is fixed to the bottom face 21e. The reinforcement 31 is provided at a plurality of positions that are distanced from each other in the traveling direction of the vehicle. The reinforcement 31 extends in the vehicular transverse direction. The reinforcement 31 and the bottom face 21e of the battery case 21 surround the entire periphery of the harness 41.

Figure 11:
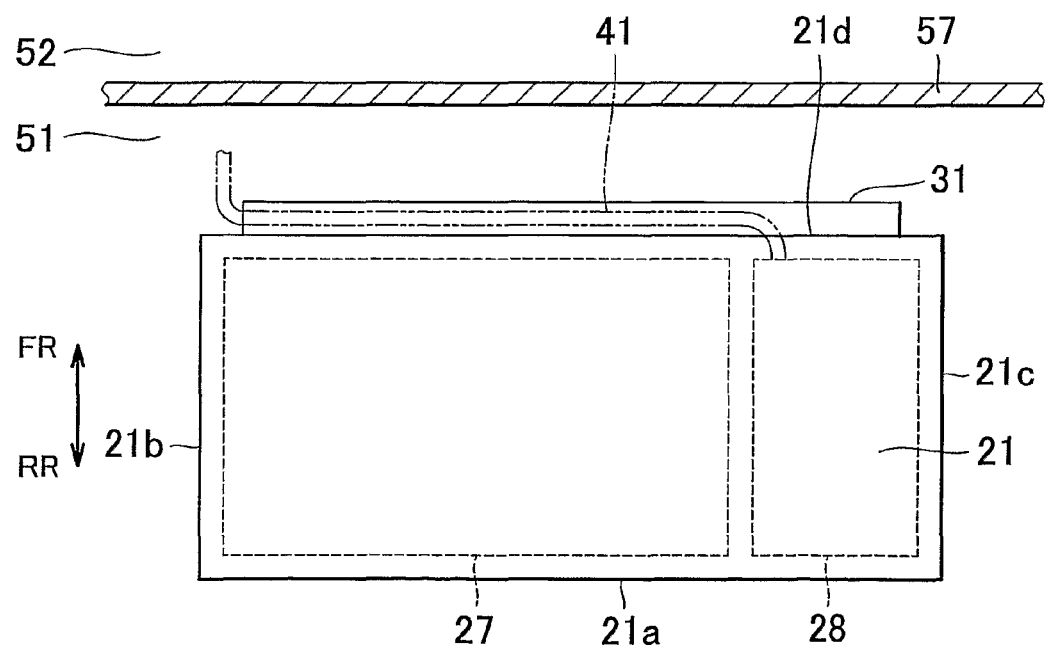
FIG. 11 is a plan view of the battery pack showing a second of the harness routing structure in the second embodiment.

FIG. 11 is a plan view of the battery pack 20 showing a second modification of the harness routing structure in the second embodiment. As shown in FIG. 11, the battery case 21 further has a side face 21d which faces forward of the vehicle, and side faces 21b and 21c that face in the vehicular transverse directions. In this modification, the reinforcement 31 is fixed to the side face 21d. The reinforcement 31 is provided between the battery case 21 and a partition panel 57 that divides the luggage compartment 51 and the vehicle cabin 52. The reinforcement 31 is provided on a portion of the battery case 21 which faces the partition panel 57, that is, a vehicular forward side of the battery case 21.

The harness 41 is routed at a position along the reinforcement 31, in a path that passes along the vehicular forward side of the battery case 21. The harness 41 is, for example, a high-voltage cable that extends out from the electric appliance 28 to an electronic controlled power steering (EPS).

According to the harness routing structure in the second embodiment constructed as described above, substantially the same effect as described above in connection with the first embodiment can be attained. In addition, in this embodiment, since the harness 41 is routed at a position along the reinforcement 31 that is formed of metal, leakage of electromagnetic waves emitted from the harness 41 can be reduced to a low level.

Incidentally, the harness routing structures described in conjunction with the first embodiment and the second embodiment may be appropriately combined to construct a different harness routing structure. For example, in a construction as shown in FIG. 11, the reinforcement 31 may be formed inside the battery case 21, and the harness 41 may be routed in the internal space 18. The position of the reinforcement 31 is not limited to the above-described positioned, but the reinforcement 31 may be provided, for example, on the side face 21b or the side face 21c in FIG. 11. Besides, the reinforcement 31 may be provided on a plurality of side faces of the battery case 21. In that construction, the harness 41 may be routed at a position along the reinforcement 31 over the plurality of side faces of the battery case 21.

Besides, although in the first embodiment and the second embodiment the battery pack 20 is disposed in the luggage compartment 51, this is not restrictive. The battery pack 20 may also be disposed, for example, under a front seat or a rear seat, or under a center console disposed between the driver seat and the navigator seat at the front, or the like. Besides, in a three-row seat vehicle, the battery pack may be disposed under the second seat or the third seat.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

The invention claimed is:

1. A harness routing structure for a vehicle comprising:
   a case body adapted to be placed in said vehicle such that a shorter side thereof substanitally coincides with the longitudinal direction of the vehicle and a longer side thereof substantially coincides with the transverse direction of the vehicle, defining an internal space which houses a high-voltage electric component part in the vehicle, and being formed of a first member;
   a reinforcing member provided on the case body, formed of a second member having a greater strength than the first member, and reinforcing the case body; and
   a harness routed at a position along the reinforcing member, wherein the high-voltage electric component part is a battery unit that includes a battery and an appliance juxtaposed with the battery in a vehicular transverse direction,
   the harness is connected to the high-voltage electric component part, and
   the reinforcing member is provided on a vehicular rearward side of the case body so as to be astride the battery and the appliance.

2. The harness routing structure for a vehicle according to claim 1, wherein the reinforcing member is disposed at a side of the harness opposite from the high-voltage electric component part housed in the internal space, in a sectional view taken on a plane orthogonal to an extending direction of the harness.

3. The harness routing structure for a vehicle according to claim 1, wherein the reinforcing member is angularly bent so that a recess portion is formed at a side of the harness opposite from the high-voltage electric component part housed in the internal space, and faces the harness, in a sectional view taken on a plane orthogonal to an extending direction of the harness.

4. The harness routing structure for a vehicle according to claim 1, wherein the reinforcing member is curved so that a recess portion is formed at a side of the harness opposite from the high-voltage electric component part housed in the internal space, and faces the harness, in a sectional view taken on a plane orthogonal to an extending direction of the harness.

5. The harness routing structure for a vehicle according to claim 1, wherein the harness is routed in the internal space.

6. The harness routing structure for a vehicle according to claim 1, wherein the harness is routed outside the internal space.

7. The harness routing structure for a vehicle according to claim 1, wherein the reinforcing member is formed of a metal.

8. The harness routing structure for a vehicle according to claim 7, wherein the reinforcing member is formed of a steel.

* * * * *